(12) United States Patent
Xie et al.

(10) Patent No.: US 9,904,228 B2
(45) Date of Patent: Feb. 27, 2018

(54) SHEET CONVEYANCE APPARATUS, IMAGE READING APPARATUS, AND IMAGE FORMING APPARATUS

(71) Applicant: CANON FINETECH INC., Misato-shi, Saitama (JP)

(72) Inventors: Jianxun Xie, Kashiwa (JP); Hiroki Takayama, Yashio (JP)

(73) Assignee: Canon Finetech Nisca, Inc., Misato-shi (JP)

( * ) Notice: Subject to any disclaimer, the term of this patent is extended or adjusted under 35 U.S.C. 154(b) by 0 days.

(21) Appl. No.: 14/700,356

(22) Filed: Apr. 30, 2015

(65) Prior Publication Data
US 2015/0329303 A1    Nov. 19, 2015

(30) Foreign Application Priority Data

May 14, 2014 (JP) .................................. 2014-100301
May 14, 2014 (JP) .................................. 2014-100302

(51) Int. Cl.
*B65H 3/52*    (2006.01)
*B65H 5/06*    (2006.01)
(Continued)

(52) U.S. Cl.
CPC .............. *G03G 15/602* (2013.01); *B65H 1/04* (2013.01); *B65H 3/06* (2013.01); *B65H 3/0684* (2013.01);
(Continued)

(58) Field of Classification Search
CPC ........ B65H 3/5261; B65H 3/52; B65H 5/062; B65H 5/068; B65H 3/0684;
(Continued)

(56) References Cited

U.S. PATENT DOCUMENTS 5,896,472 A    4/1999   Takayama
6,059,280 A *  5/2000   Yamauchi ............ B65H 3/5261
                                                      193/35 R
(Continued)

FOREIGN PATENT DOCUMENTS

CN    1313337 C    5/2007
JP    09-272640 A  10/1997
(Continued)

OTHER PUBLICATIONS

Chinese Office Action issued in corresponding Chinese Application No. 201510245401.8 dated Jul. 15, 2016.

*Primary Examiner* — Luis A Gonzalez
(74) *Attorney, Agent, or Firm* — Fitzpatrick, Cella, Harper & Scinto

(57) ABSTRACT

A sheet conveyance apparatus, including: a rotatable first rotary member; a second rotary member configured to rotate together with the first rotary member to nip and convey a sheet; a rotary member support unit configured to support the first rotary member in a mountable and removable manner, the rotary member support unit being pivotally movable in a direction intersecting with a conveyance direction of the sheet; and a regulating member configured to regulate pivotal movement of the rotary member support unit so that the first rotary member is fitted into a predetermined position of the rotary member support unit when the first rotary member is mounted.

17 Claims, 13 Drawing Sheets

(51) Int. Cl.
- *G03G 15/00* (2006.01)
- *B65H 1/04* (2006.01)
- *B65H 3/06* (2006.01)
- *B65H 7/20* (2006.01)
- *G06K 15/16* (2006.01)

(52) U.S. Cl.
CPC ........... *B65H 3/5261* (2013.01); *B65H 5/062* (2013.01); *B65H 5/068* (2013.01); *B65H 7/20* (2013.01); *G06K 15/16* (2013.01); *B65H 2402/515* (2013.01)

(58) Field of Classification Search
CPC .......... B65H 2404/17; B65H 2601/324; B65H 2402/515; B65H 2402/31; B65H 2402/5152; B65H 2402/521; B65H 2402/52; B65H 2402/64; G03G 2221/1687; G03G 2221/1678; H04N 1/00557; H04N 1/00559; H04N 1/00543; H04N 1/00551

See application file for complete search history.

(56) References Cited

U.S. PATENT DOCUMENTS

| 6,647,218 | B2 | 11/2003 | Takayama |
| 6,659,450 | B2* | 12/2003 | Fukasawa ............ B65H 3/5223 271/121 |
| 7,841,593 | B2 | 11/2010 | Toba et al. |

FOREIGN PATENT DOCUMENTS

| JP | 2001097587 A | * | 4/2001 |
| JP | 2001-315991 A | | 11/2001 |
| JP | 2001315991 A | * | 11/2001 |
| JP | 2006-160497 A | | 6/2006 |
| JP | 2012-166926 A | | 9/2012 |

* cited by examiner

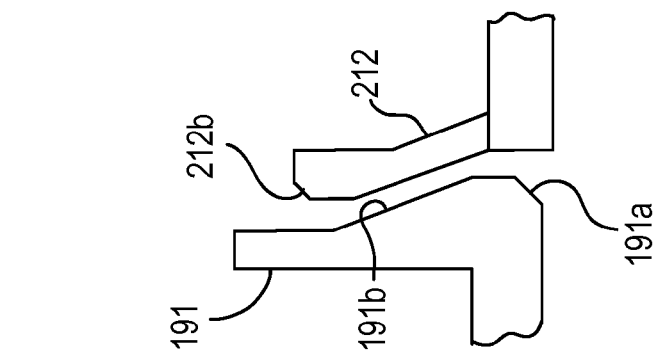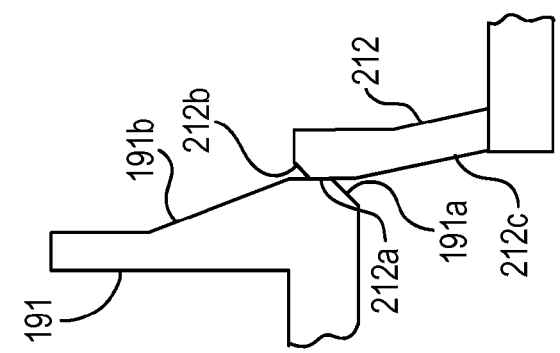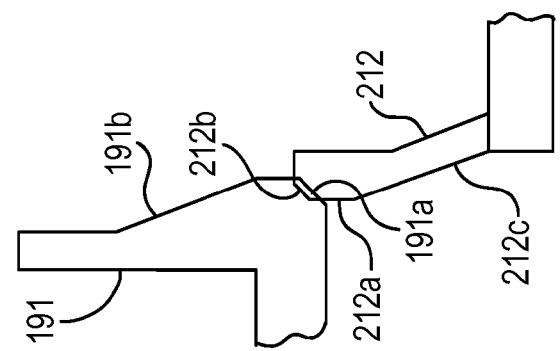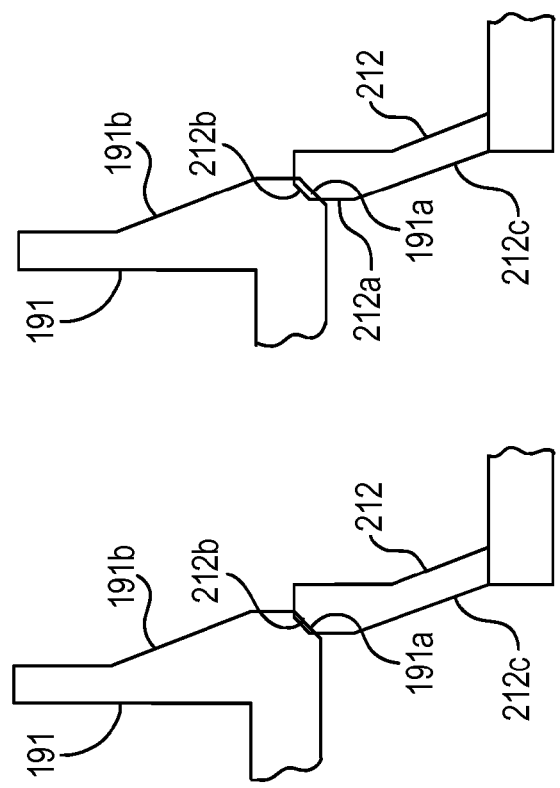

SHEET CONVEYANCE APPARATUS, IMAGE READING APPARATUS, AND IMAGE FORMING APPARATUS

BACKGROUND OF THE INVENTION

Field of the Invention

The present invention relates to a sheet conveyance apparatus configured to convey a sheet, an image reading apparatus including the sheet conveyance apparatus, and an image forming apparatus including the image reading apparatus.

Description of the Related Art

Hitherto, an image forming apparatus such as a copying machine and a printer that is configured to form an image on a sheet includes, in an apparatus main body thereof, an image reading apparatus configured to read an image of a document so that the image read by the image reading apparatus is copied. In this case, the image reading apparatus includes a sheet conveyance apparatus configured to convey the document (U.S. Pat. No. 7,841,593). In the related-art sheet conveyance apparatus, a cover member configured to hold one roller of a pair of rollers, which is independent of an outer cover, is opened so that the one roller is mountable and removable, thereby enabling replacement of the one roller.

However, the one roller serving as a rotary member may not be properly mounted when the one roller is to be mounted. In this case, the one roller is prevented from being rotated normally, thereby causing a problem in that the sheet cannot be conveyed.

SUMMARY OF THE INVENTION

The present invention provides a sheet conveyance apparatus configured to prevent improper mounting of a rotary member, an image reading apparatus including the sheet conveyance apparatus, and an image forming apparatus including the image reading apparatus.

According to one embodiment of the present invention, there is provided a sheet conveyance apparatus, comprising: a rotatable first rotary member; a second rotary member configured to rotate together with the first rotary member to nip and convey a sheet; a rotary member support unit configured to support the first rotary member in a mountable and removable manner, the rotary member support unit being pivotally movable in a direction intersecting with a conveyance direction of the sheet; and a regulating member configured to regulate pivotal movement of the rotary member support unit so that the first rotary member is fitted into a predetermined position of the rotary member support unit when the rotatable first rotary member is mounted.

According to one embodiment of the present invention, there is provided an image reading apparatus, including: the sheet conveyance apparatus; and an image reading portion configured to read a document conveyed by the sheet conveyance apparatus.

According to one embodiment of the present invention, there is provided an image forming apparatus, including: the image reading apparatus; and an image forming portion configured to form an image on a sheet in accordance with image information of the image reading apparatus.

Further features of the present invention will become apparent from the following description of exemplary embodiments with reference to the attached drawings.

BRIEF DESCRIPTION OF THE DRAWINGS

FIGS. 11A, 11B, 11C, and 11D are each a view for illustrating an engaging operation of a protruding portion of the retard roller holder and the blocking rib when the openable and closable cover is closed.

DESCRIPTION OF THE EMBODIMENTS

Now, an image reading apparatus 300 according to an embodiment of the present invention, and an image forming apparatus 100 including the image reading apparatus 300 in an apparatus main body 400 thereof will be described with reference to the drawings.

Figure 1:
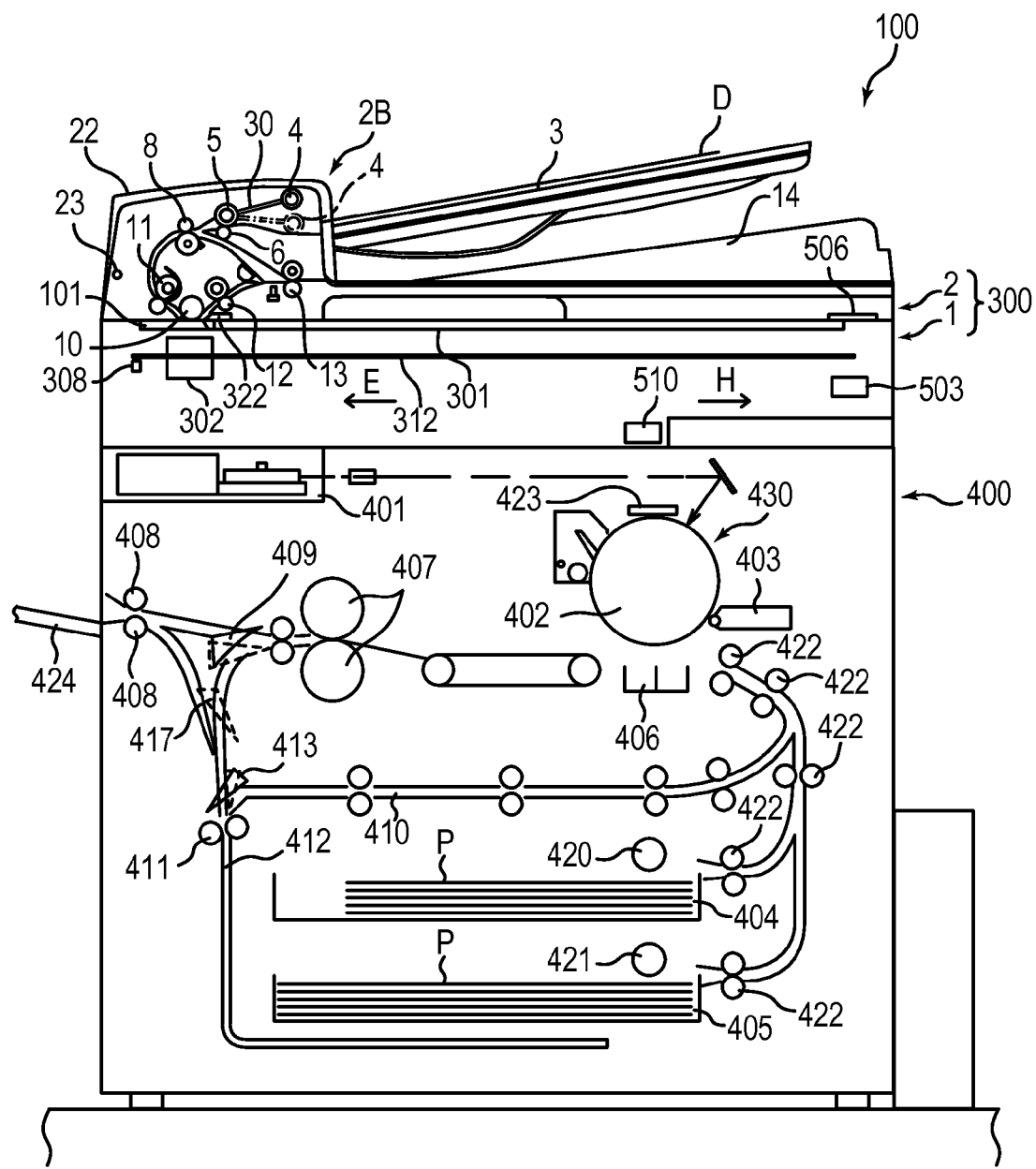
FIG. 1 is a schematic sectional view of an image forming apparatus taken along a conveyance direction of a sheet according to an embodiment of the present invention.

FIG. 1 is a schematic sectional view of the image forming apparatus 100 taken along a conveyance direction of a sheet according to the embodiment of the present invention. The image forming apparatus 100 includes the apparatus main body 400 of the image forming apparatus 100, and the image reading apparatus 300 arranged in an upper part of the apparatus main body 400.

Pickup rollers 420 and 421 in the apparatus main body 400 feed out, from cassettes 404 and 405, sheets P received in the cassettes 404 and 405. Conveyance roller pairs 422 feed the sheets fed out from the cassettes 404 and 405 into a portion between a photosensitive drum 402 and a transfer device 406.

On the other hand, a laser scanner 401 irradiates a surface of the photosensitive drum 402, which is charged by a charging device 423, with a laser. With this, a latent image is formed on the photosensitive drum 402 in accordance with image information obtained by reading a document in the image reading apparatus 300. The latent image is developed with toner into a toner image by a toner developing device 403. The transfer device 406 transfers the toner image on the photosensitive drum 402 onto the sheet, which is fed into a portion between the photosensitive drum 402 and the transfer device 406. Then, the transfer device 406 and the photosensitive drum 402 together feed the sheet P to a fixing device 407. The fixing device 407 heats the sheet P so that the toner image is fixed onto the sheet P. Finally, a delivery roller pair 408 delivers the sheet P onto a tray 424.

In a case of forming an image on both surfaces of the sheet P, the sheet P having the toner image formed on one surface and being fed out from the fixing device 407 is fed into a reverse path 412 through guidance of switching members 409, 417, and 413 and conveyance of a conveyance roller pair 411. After that, the sheet P is fed from the reverse path 412 into a return path 410 through backward rotation of the conveyance roller pair 411 and the guidance of the switching member 413. During this, front and back surfaces of the sheet P are reversed through switch-back conveyance. The sheet P is guided into the return path 410, and fed into a portion between the photosensitive drum 402 and the transfer device 406 one more time, thereby forming the toner image on another surface. The toner image is fixed onto the sheet P in the fixing device 407, and then the sheet P is finally delivered onto the tray 424.

An image forming portion 430 includes the charging device 423, the photosensitive drum 402, the toner developing device 403, the transfer device 406, and the like.

The image reading apparatus 300 includes an image reading portion 1 configured to read an image of the document, and an automatic document conveyance portion 2 serving as a sheet conveyance apparatus, which is arranged above the image reading portion 1 and configured to feed the document into the image reading portion 1. The automatic document conveyance portion 2 is arranged in a freely openable and closable manner with respect to the image reading portion 1.

In FIG. 1, the image reading portion 1 includes a fixed-reading glass 301, a flow-reading glass 101, a scoop-up member 322, and the like in a portion opposed to the automatic document conveyance portion 2. Further, the image reading portion 1 includes, in an inside thereof, a scanning portion 302, a signal processing portion 503, a motor 308 and a belt 312 each configured to move the scanning portion 302 in the sub-scanning directions H and E, a control portion 510 configured to control the image reading apparatus 300, and the like.

Figure 2:
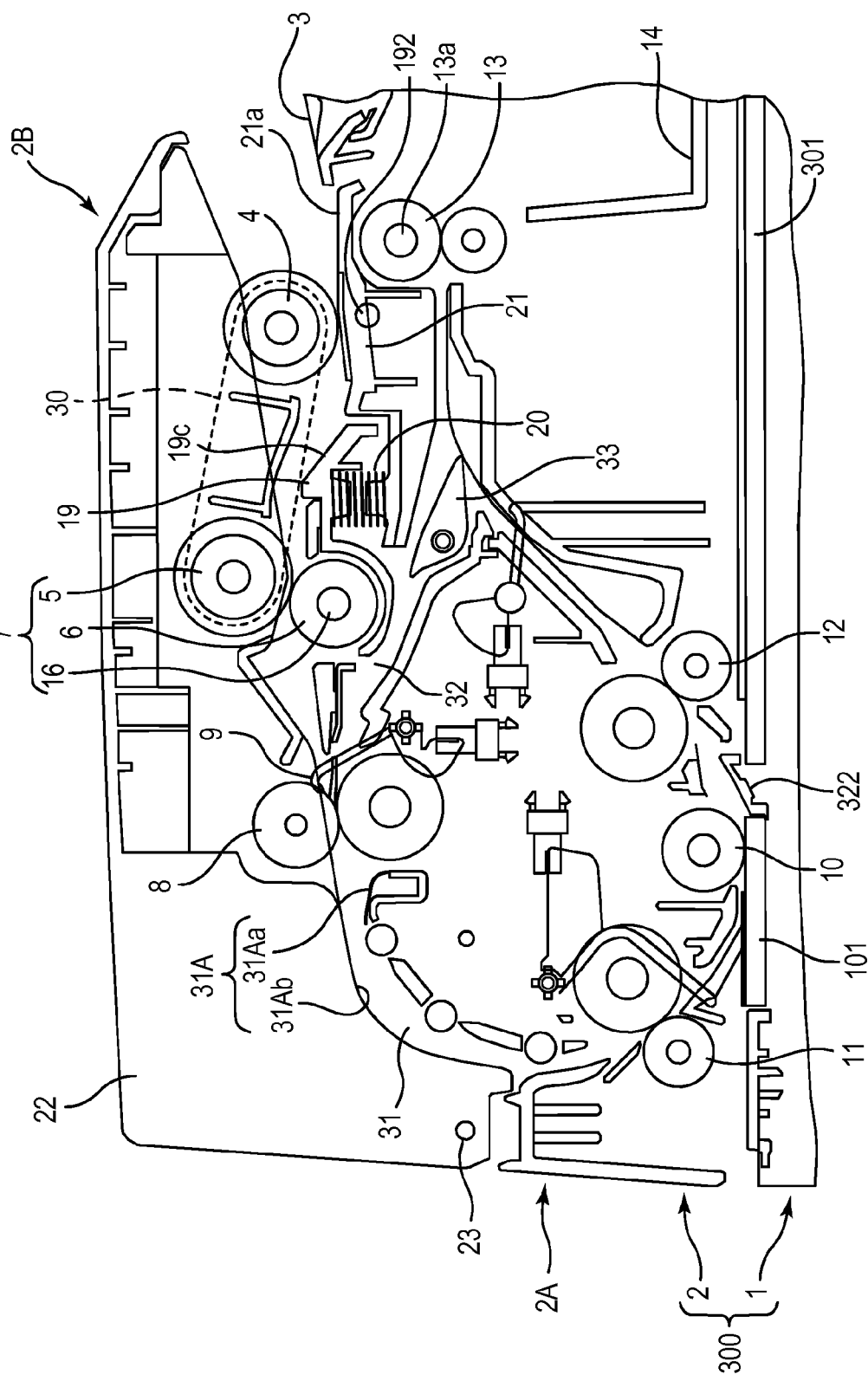
FIG. 2 is an enlarged sectional view of a main part of an automatic document conveyance portion taken along a conveyance direction of a document.
Figure 3:
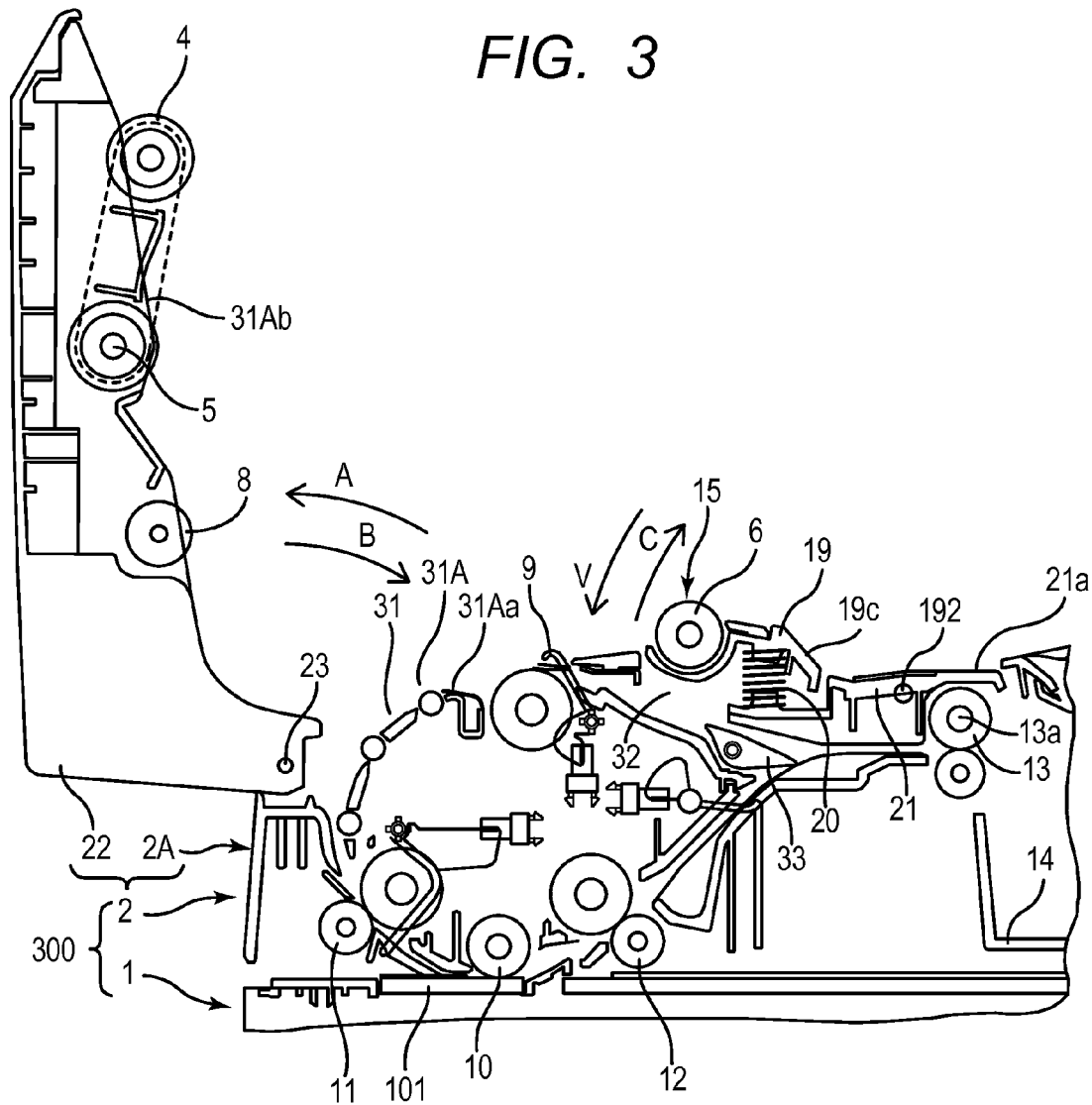
FIG. 3 is a view illustrating an open state of an openable and closable cover of the automatic document conveyance portion from a closed state in FIG. 2.
Figure 4:
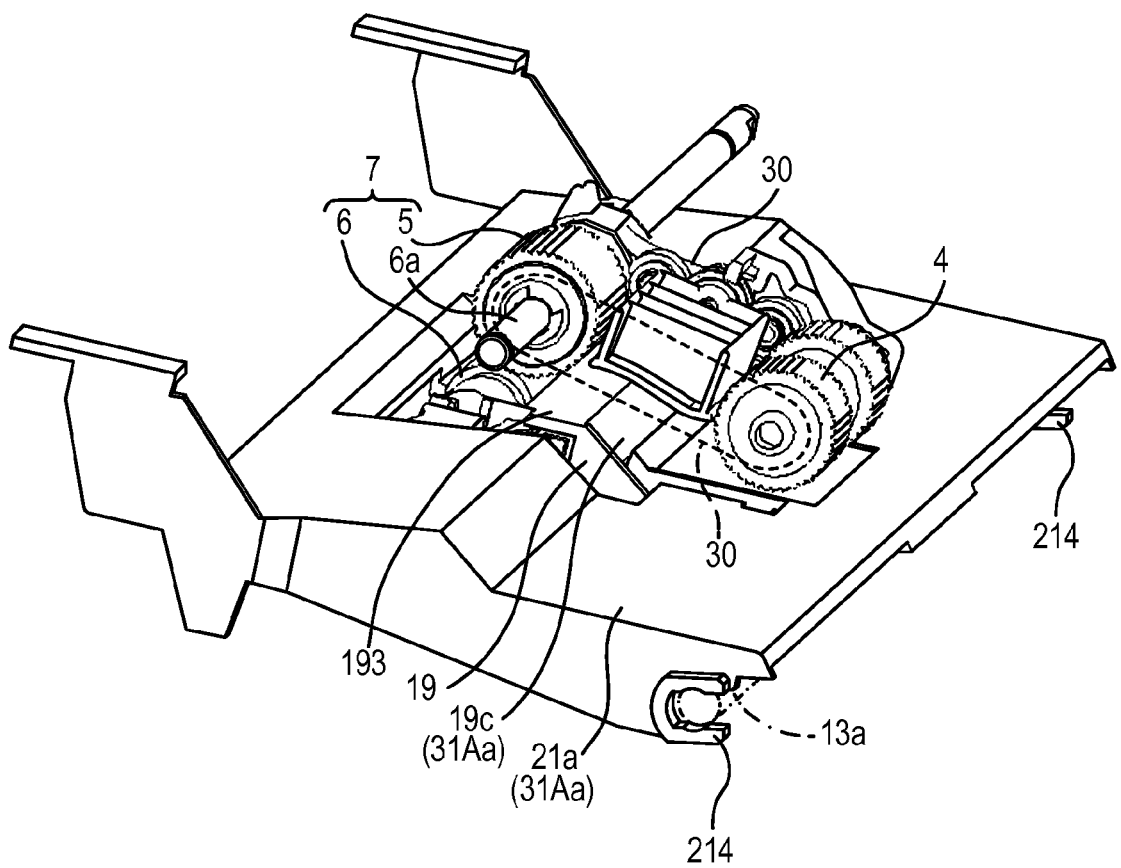
FIG. 4 is a perspective view of a separating portion of the automatic document conveyance portion.

FIG. 2 is an enlarged sectional view of a main part of the automatic document conveyance portion 2 taken along a conveyance direction of a document D. FIG. 3 is a view illustrating an open state of an openable and closable cover 22 of the automatic document conveyance portion 2 from a closed state in FIG. 2. FIG. 4 is a perspective view of a separating portion 7 of the automatic document conveyance portion 2.

First, a flow-reading operation of the image reading apparatus 300 will be described.

As illustrated in FIG. 1, the documents D are placed by a user on a document tray 3 serving as a stacking portion capable of stacking the documents D. With reference to FIGS. 1, 2, and 3, a pickup roller 4 of the automatic document conveyance portion 2 feeds the document D into the separating portion 7 including a separate-conveyance roller (separating member) 5 and a retard roller 6. The separate-conveyance roller 5 and the retard roller 6 are brought into contact with each other, and each configured to separate the documents D to be conveyed. The separating portion 7 conveys the document D to a registration roller pair 8. However, a plurality of overlapped documents may be conveyed to the separating portion 7 from the pickup roller 4. In this case, the retard roller 6 of the separating portion 7 inhibits the conveyance of the overlapped documents so that a single topmost document D is conveyed by the separate-conveyance roller 5.

The registration roller pair 8 receives a leading edge of the document D, which is fed from the separating portion 7, to thereby correct skew-feed of the document D and convey the document D to a portion between the flow-reading glass 101 and a white roller 10 in accordance with a reading timing. The reading timing is determined based on detection of the leading edge of the document D, which is fed from the separating portion 7, by a registration sensor 9. When the reading timing is determined, the image of the document D is read by the scanning portion 302, which is in a standby state below the flow-reading glass 101 in advance. Then, lead roller pairs 11 and 12 convey the document D so that the document D passes above the flow-reading glass 101. Finally, a document delivery roller pair 13 delivers the document D onto a document delivery tray 14. A document guide path 31 is formed in a region from the pickup roller 4 to the document delivery roller pair 13. The document D is conveyed through guidance of the document guide path 31.

In a case where an image is formed on both surfaces of the document D, the document delivery roller pair 13 conveys the document D up to its trailing edge so as not to deliver the document D onto the document delivery tray 14. Then, the document delivery roller pair 13 rotates backward to feed the document D backward so that the document D is conveyed into a switch-back path 32 through guidance of a switching member 33. With this, the document D is turned over (reversed) during the switch-back conveyance, and is conveyed through the document guide path 31 to reach the document delivery roller pair 13. During this, the scanning portion 302 reads an image on another surface of the document D.

The document D is turned over due to the switch-back conveyance described above, and hence a page order of the documents D is not arranged properly when the documents D are delivered onto the document delivery tray 14 as they are. Therefore, the documents D may be delivered onto the document delivery tray 14 after being subjected to the switch-back conveyance one more time. At this time, the scanning portion 302 does not read the images of the documents D.

As described above, a method of reading an image by causing the document D to pass above the stationary scanning portion 302 is referred to as "flow-reading".

Next, a fixed-reading operation of the image reading apparatus 300 will be described.

The user lifts up the automatic document conveyance portion 2 on a near side to open an upper surface of the fixed-reading glass 301, places the document D on the upper surface, and then returns the automatic document conveyance portion 2 to its original position. As a result, the automatic document conveyance portion 2 presses the document D against the fixed-reading glass 301 so that the document D is prevented from rising with respect to the fixed-reading glass 301. After that, the scanning portion 302 moves in the sub-scanning direction H to read the image of the document D. When the scanning portion 302 finishes reading the image of the document D, the scanning portion 302 moves in the sub-scanning direction E to return to a standby position (not shown).

As described above, a method of reading the document D by fixing the document D and moving the scanning portion 302 is referred to as "fixed-reading".

The image reading apparatus 300 converts optical information of image information, which is obtained by reading the document D through the flow-reading or the fixed-reading, into an electrical signal in the signal processing portion 503, and then transmits the electrical signal to the laser scanner 401. The apparatus main body 400 of the image forming apparatus 100 copies the image of the document D to the sheet P in accordance with the image information received by the laser scanner 401 as described above.

Note that, the image forming apparatus 100 may also receive, by the laser scanner 401, image information from an external device, such as another image forming apparatus 100, a facsimile machine, and a personal computer, to thereby form an image on the sheet.

By the way, maintenance may be performed on an inside of the automatic document conveyance portion 2. Further, the document D may be jammed in the document guide path 31. Still further, the retard roller 6 may be replaced. In view of the above, as illustrated in FIG. 3, an upstream-side portion 31A of the document guide path 31 is configured to be opened by opening the openable and closable cover 22 so that the maintenance, removal of the jammed document D, the replacement of the retard roller 6, or the like is performed. The openable and closable cover is configured to open and close the upstream-side portion 31A of the document guide path 31 due to a rotation support shaft 23 arranged in an apparatus main body 2A of the automatic document conveyance portion 2. The upstream-side portion 31A of the document guide path 31 serving as a conveyance path is formed of a lower guide portion 31Aa and an upper guide portion 31Ab, which are capable of coming close to and separating away from each other.

As illustrated in FIG. 3, the upper guide portion 31Ab is formed in the openable and closable cover 22. The openable and closable cover 22 includes the pickup roller 4, the separate-conveyance roller 5, one roller of the registration roller pair 8, and the like, which each protrude from a guide surface of the upper guide portion 31Ab. As illustrated in FIG. 3, when the document guide path 31 is opened by the openable and closable cover 22, the document D jammed in the document guide path 31 can be removed.

Figure 5A:
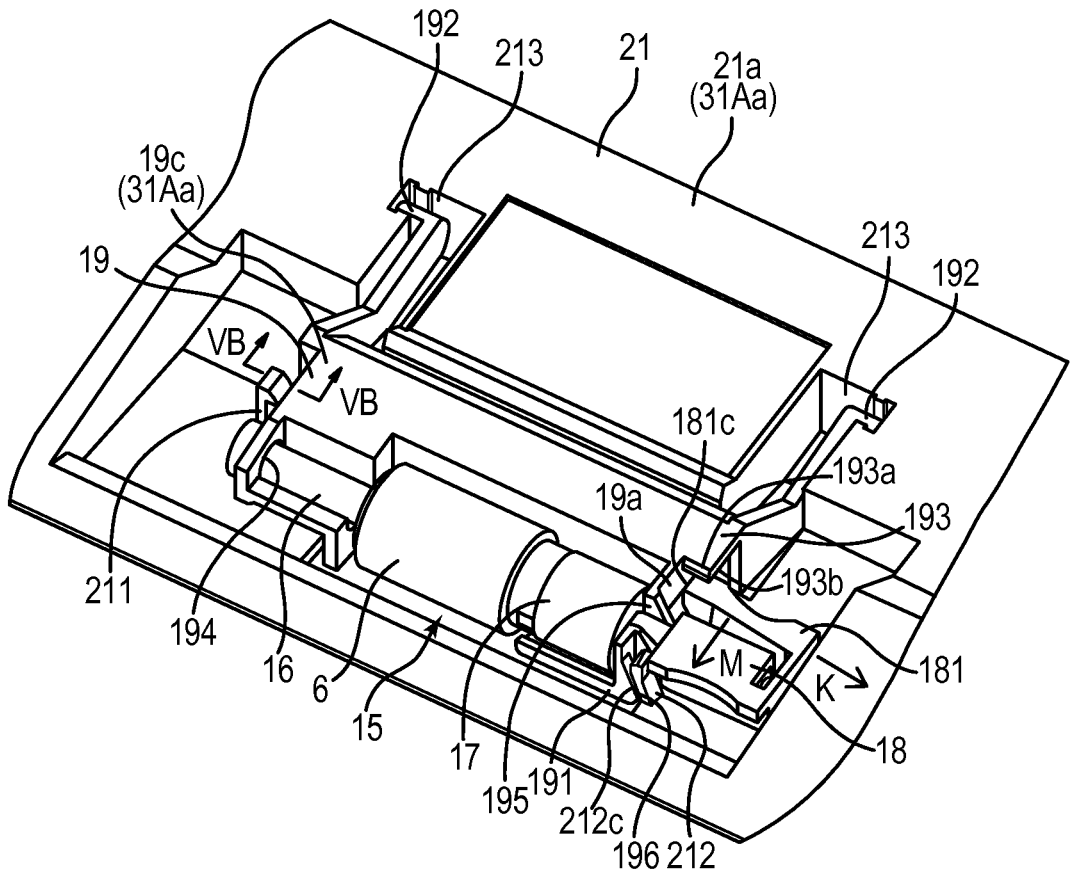
FIG. 5A is a perspective view of a retard roller unit including a retard roller and its periphery when a document guide path is opened by the openable and closable cover.
Figure 6:
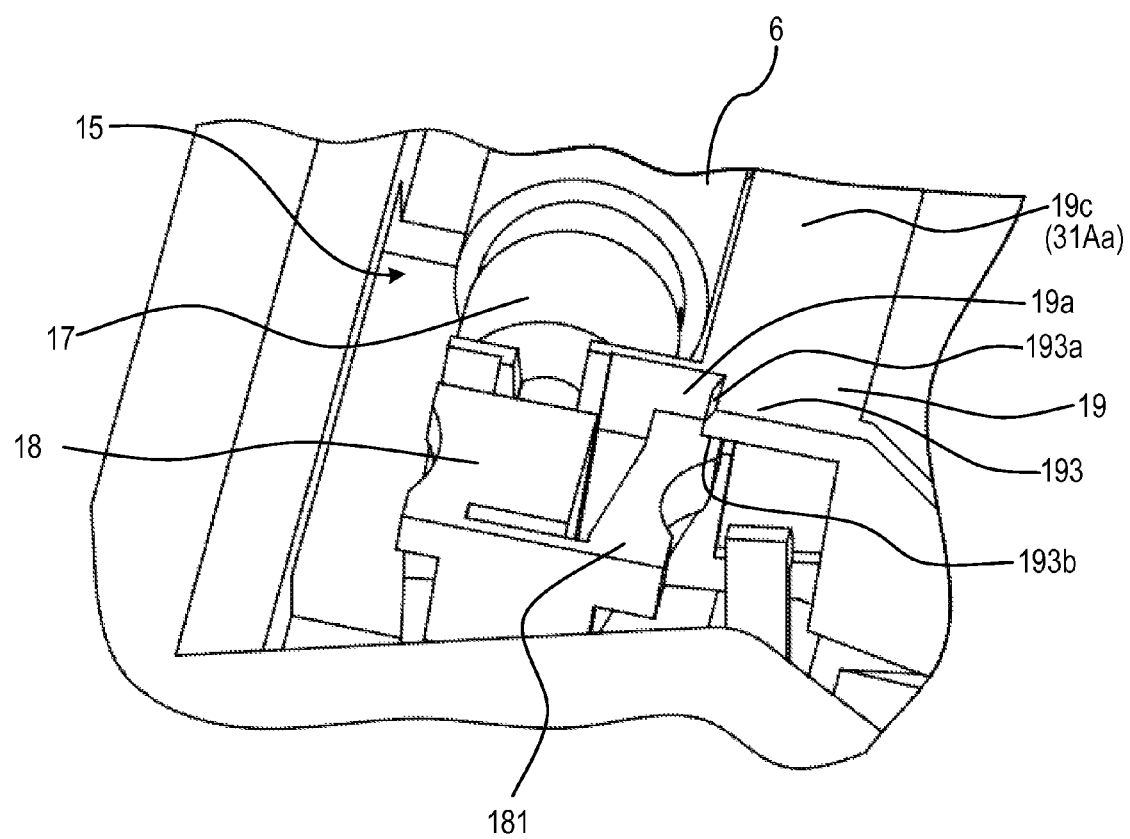
FIG. 6 is a perspective view of the retard roller unit including the retard roller and its periphery when the document guide path is opened by the openable and closable cover.
Figure 7:
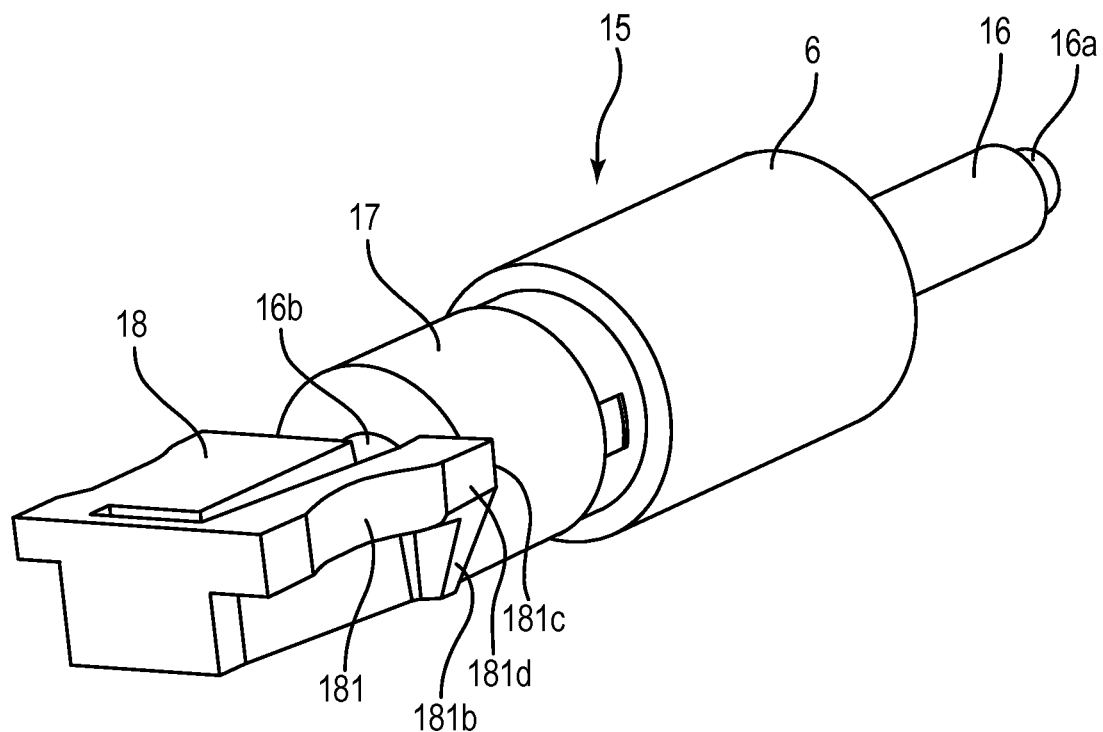
FIG. 7 is a perspective view of the retard roller unit.
Figure 8A:
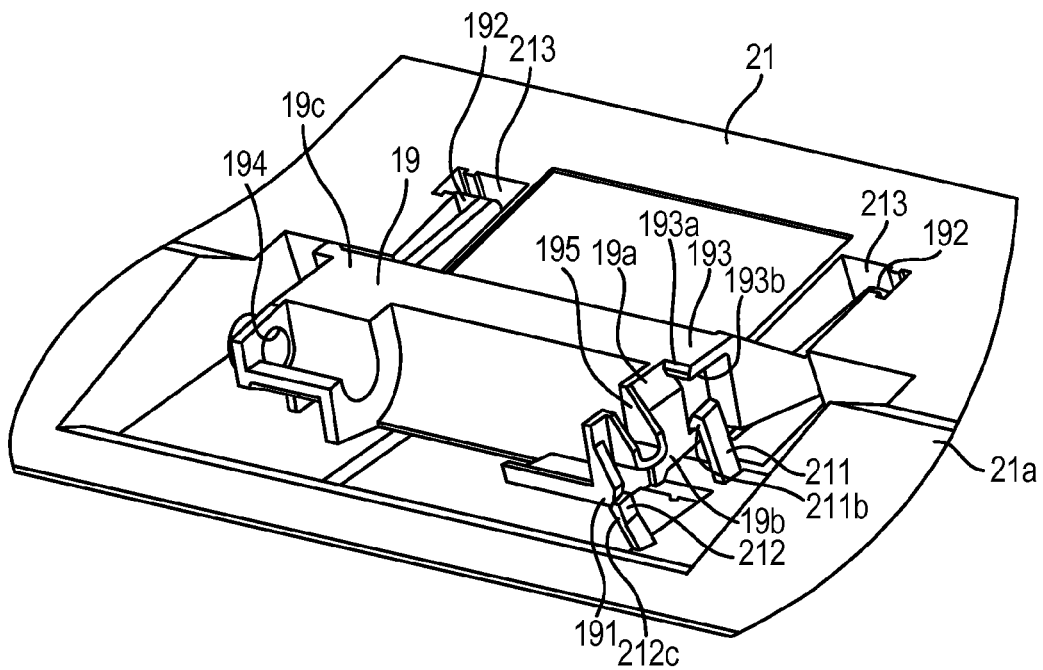
FIG. 8A is a perspective view of a retard roller holder and its periphery when the retard roller unit in FIGS. 5A and 6 is removed and the retard roller holder is located at a replacement position.
Figure 9A:
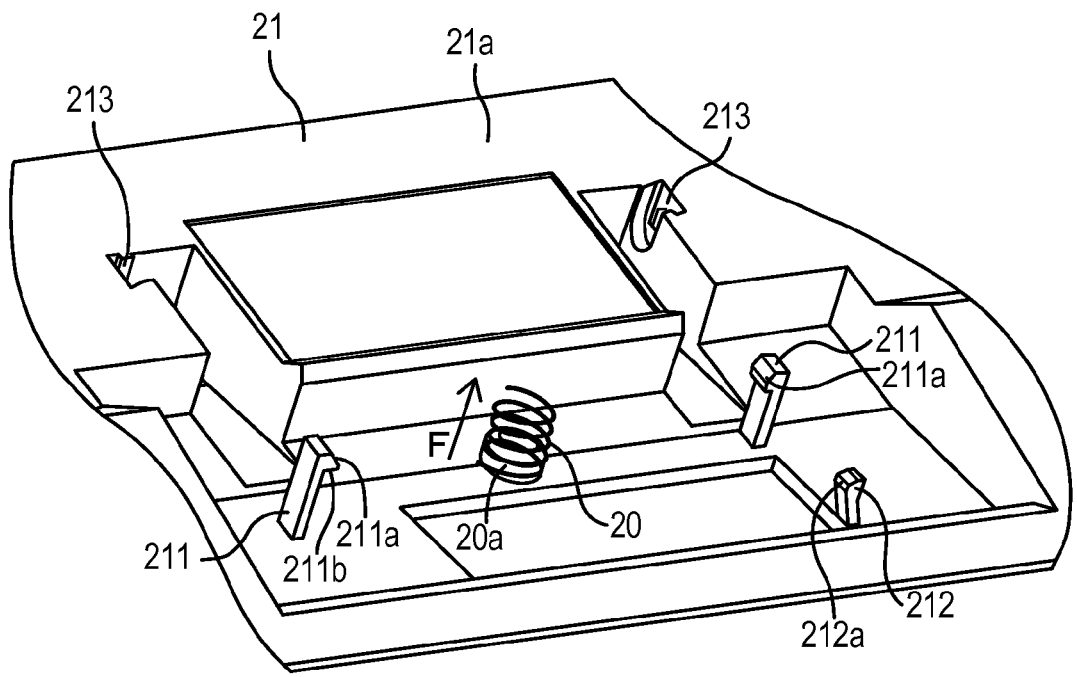
FIG. 9A is a perspective view of a conveyance guide when the retard roller holder in FIG. 8A is removed.

Next, a structure to perform the maintenance on the inside of the automatic document conveyance portion 2, and the replacement of the retard roller 6 will be described. FIG. 4 is a perspective view of the separating portion 7. FIGS. 5A and 6 are each a perspective view of a retard roller unit 15 including the retard roller 6 and its periphery when the document guide path 31 is opened by the openable and closable cover 22. FIG. 7 is a perspective view of the retard roller unit 15. FIG. 8A is a perspective view of a retard roller holder 19 and its periphery when the retard roller unit 15 in FIGS. 5A and 6 is removed. FIG. 9A is a perspective view of a conveyance guide 21 when the retard roller holder 19 in FIG. 8A is removed.

In the automatic document conveyance portion 2, a document receiving portion 2B (FIG. 2) including the pickup roller 4, the retard roller 6, and the like will be described. The document receiving portion 2B of the automatic document conveyance portion 2 includes the pickup roller 4, an inlet portion of the document guide path 31, the separating portion 7, the retard roller unit 15, the retard roller holder 19, a compression coil spring 20, the conveyance guide 21, and the like.

As illustrated in FIGS. 2, 3, and 4, the separating portion 7 includes the separate-conveyance roller 5 serving as a second rotary member, which is configured to separate the documents D placed on the document tray 3 to be conveyed, and the retard roller 6 serving as a first rotary member. Specifically, the separate-conveyance roller 5 and the retard roller 6 are rotatable, configured to nip and convey the documents, and configured to separate the documents D to be conveyed.

In FIG. 7, the retard roller 6 and a torque limiter 17 are united as the retard roller unit 15, and hence the retard roller 6 is easily replaced. The retard roller unit 15 includes the retard roller 6, a retard roller shaft 16 configured to support the retard roller 6 in a freely rotatable manner, the torque limiter 17 arranged on the retard roller shaft 16, and a grip 18 fixed to one end of the retard roller shaft 16. The torque limiter 17 is formed into a double cylindrical shape (not shown), in which an outer cylinder is connected to the retard roller 6 and an inner cylinder is fixed to the retard roller shaft 16, so that a predetermined rotational load torque is applied to the retard roller 6. The grip 18 is a portion to be held by the user when the retard roller unit 15 is handled at a time of the replacement and the like, and is formed so that the handling of the retard roller unit 15 is facilitated.

Figure 5B:
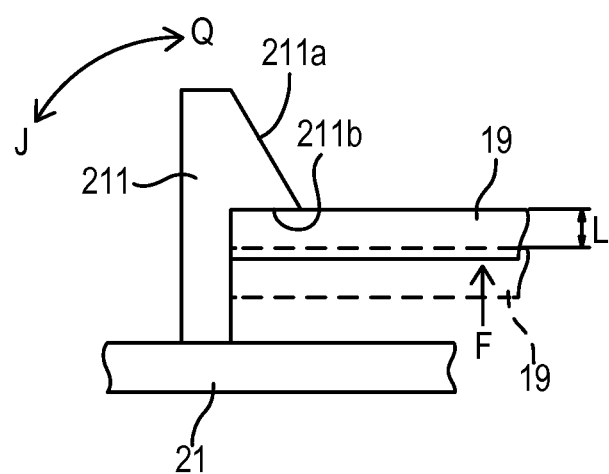
FIG. 5B is a sectional view taken and viewed in a direction indicated by the arrow VB-VB in FIG. 5A.

In FIGS. 2 and 3, the conveyance guide 21 is arranged in a freely rotatable manner with respect to a rotation shaft 13a of one roller of the document delivery roller pair 13. Further, in FIGS. 5A, 8A, and 9A, a pair of bearing recessed portions 213, which is configured to support a pair of support shafts 192 of the retard roller holder 19 in a freely rotatable manner, is formed in the conveyance guide 21. Further, in FIG. 9A, a pair of catching members 211 and one blocking rib 212, which are each configured to regulate a protruding amount of the retard roller holder 19, are arranged to protrude upward in the conveyance guide 21. As illustrated in FIG. 5B, the catching members 211 are warped in the arrow directions J and Q.

In FIGS. 5A, 6, and 8A, the pair of support shafts 192 of the retard roller holder 19 is supported in a freely pivotable manner by the pair of bearing recessed portions 213 of the conveyance guide 21. In FIG. 3, the retard roller holder 19 is pivotally moved in the arrow directions C and V intersecting with an upper surface 21a of the conveyance guide 21. The retard roller unit 15 is mounted to (mountable to and removable from) the retard roller holder 19 in a freely mountable and removable manner. Thus, as illustrated in FIG. 8A, a support hole 194 and a U-shaped support groove 195, which are each configured to support the retard roller shaft 16, are formed in the retard roller holder 19.

Further, as illustrated in FIGS. 2 and 3, the compression coil spring 20 is arranged between the conveyance guide 21 and the retard roller holder 19. As illustrated in FIG. 9A, a seat 20a in which the compression coil spring 20 is to be fitted thereon is formed to protrude in the conveyance guide 21. The compression coil spring 20 is capable of pressing the retard roller holder in the arrow direction F so that the retard roller holder 19 separates away from the conveyance guide 21, and configured to press the retard roller 6 against the separate-conveyance roller 5. Note that, a leaf spring or the like may be used instead of the compression coil spring 20. The retard roller holder 19 is pressed upward by the compression coil spring 20 when the openable and closable cover 22 is opened as illustrated in FIG. 3, thereby being received by a lower surface 211b of a hook 211a of each of the catching members 211 of the conveyance guide 21 as illustrated in FIG. 5B. The catching members 211 regulate an amount in which the compression coil spring 20 presses the retard roller holder 19 upward.

Next, a procedure of mounting the retard roller unit 15 to the retard roller holder 19 at a time of replacing the retard roller 6 will be described. The retard roller holder 19 is pressed upward by the compression coil spring 20 when the openable and closable cover 22 is opened as illustrated in FIG. 8A, thereby being received by the lower surface 211b of the hook 211a of each of the catching members 211 of the conveyance guide 21 as illustrated in FIG. 5B. In this case, the catching members 211 regulate an amount in which the compression coil spring 20 presses the retard roller holder 19 upward to regulate the protruding amount of the retard roller holder 19.

At a time of mounting the retard roller unit 15, one end portion 16a of the retard roller shaft 16 of the retard roller unit 15 (FIG. 7) is inserted into the support hole 194 of the retard roller holder 19 illustrated in FIG. 8A, and a middle portion 16b of the retard roller shaft 16 is pressed into the support groove 195. As illustrated in FIG. 7, an elastically deformable rib 181 is formed in the grip 18 of the retard roller unit 15. The rib 181 is formed to extend in parallel to the retard roller shaft 16 from another end portion of the retard roller shaft 16 toward the torque limiter 17 side. An inclined surface 181b, a distal end surface 181c, and a side end surface 181d are formed in the rib 181. The inclined surface 181b is formed from the side end surface 181d to extend downward and be inclined toward an inner side of the grip 18, that is, to be inclined in the rotation direction of the retard roller 6. On the other hand, as illustrated in FIG. 8A, a tongue piece 193 extending toward the support groove 195 side is formed to protrude in the retard roller holder 19. The rib 181 is to be brought into abutment against the tongue piece 193. An inclined surface 193a is formed on an upper side of a distal end portion of the tongue piece 193. Further, an inclined surface 19a that is inclined outward, and a side wall 19b that is continuous with a lower side of the inclined surface 19a are formed in a side surface of the retard roller holder 19.

At a time of mounting the retard roller unit 15, the retard roller unit 15 is pressed toward the retard roller holder 19. Then, first, the distal end surface 181c of the rib 181 is brought into abutment against the inclined surface 19a of the retard roller holder 19, and the inclined surface 181b of the rib 181 is brought into abutment against the inclined surface 193a of the retard roller holder 19. Then, as illustrated in FIG. 5A, the rib 181 is elastically deformed in the arrow direction M while being pressed in the arrow direction K. After that, the rib 181 is still pressed to pass along the inclined surfaces 19a and 193a and be located at a lower surface 193b of the tongue piece 193, thereby returning to its original shape due to elasticity. Further, the rib 181 enters below the lower surface 193b of the tongue piece 193, and is prevented from rising by the tongue piece 193.

In this way, the retard roller unit 15 is mounted to the retard roller holder 19. However, when the user mounts the retard roller unit 15 to the retard roller holder 19, the retard roller unit 15 may not be reliably mounted to the retard roller holder 19.

First, an operation of a protruding portion 191 and the blocking rib 212 will be described in a case where the retard roller unit 15 is mounted to the retard roller holder 19, and the openable and closable cover 22 is closed.

When the openable and closable cover 22 serving as an openable and closable member is closed, the retard roller unit 15 is pressed toward the retard roller holder at the same time. Then, the protruding portion 191 formed to protrude laterally in a side portion of the retard roller holder 19 enters below a lower inclined surface 212c of the elastically deformable blocking rib 212 serving as a regulating member, which is formed to protrude upward in the conveyance guide 21.

Figure 8B:
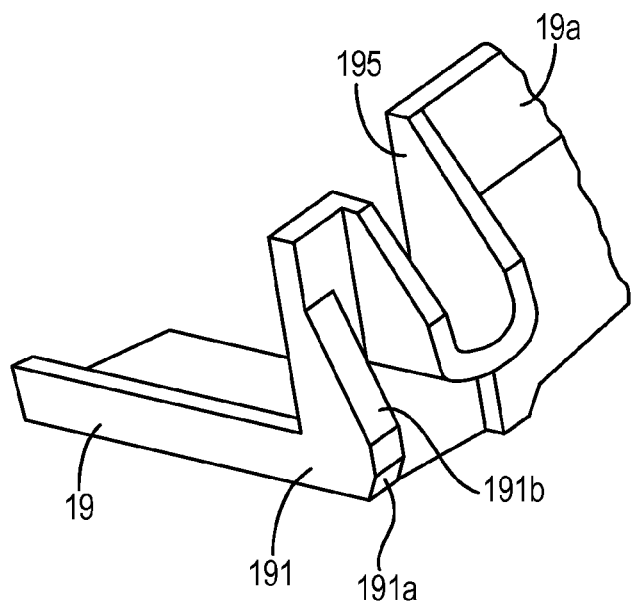
FIG. 8B is a perspective view of a support groove of the retard roller holder.
Figure 9B:
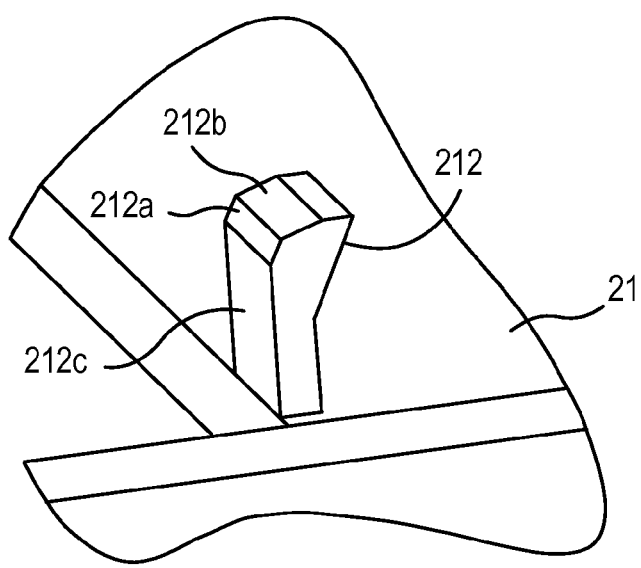
FIG. 9B is a perspective view of a blocking rib.

As illustrated in FIG. 8A, the protruding portion 191 is formed to protrude in a direction along the groove of the support groove 195 in the vicinity of the support groove 195. Further, as illustrated in FIG. 8B, the protruding portion 191 is formed of a lower inclined surface 191a and an upper inclined surface 191b. An inclination of the lower inclined surface 191a is steeper than that of the upper inclined surface 191b. As illustrated in FIG. 9B, a protruding portion 212a is also formed in the blocking rib 212. The protruding portion 212a is formed at a position to be opposed to the protruding portion 191 of the retard roller holder 19. The protruding portion 212a is formed of an upper inclined surface 212b and the lower inclined surface 212c. An inclination of the upper inclined surface 212b is steeper than that of the lower inclined surface 212c.

Next, with reference to FIGS. 11A, 11B, 11C, and 11D, a state of each of the blocking rib 212 and the protruding portion 191 of the retard roller holder 19 when the openable and closable cover 22 is closed will be described in detail. FIGS. 11A, 11B, 11C, and 11D are each a schematic sectional view of the vicinity of the protruding portion 191 in the order of FIGS. 11A, 11B, 11C, and 11D when the openable and closable cover 22 is to be closed.

When the openable and closable cover 22 is closed, as illustrated in FIG. 11A, first, the lower inclined surface 191a of the protruding portion 191 of the retard roller holder 19 is brought into abutment against the upper inclined surface 212b of the blocking rib 212 at the same time. After that, as illustrated in FIGS. 11B and 11C, in association with a closing operation of the openable and closable cover 22, the protruding portion 191 of the retard roller holder 19 is pressed downward while the protruding portion 191 and the protruding portion 212a of the blocking rib 212 are brought into abutment against each other. Then, when the openable and closable cover 22 is fully closed, the protruding portion 191 enters below the lower inclined surface 212c as illustrated in FIG. 11D. At this time, the retard roller 6 is brought into abutment against the separate-conveyance roller 5 so that the retard roller 6 and the separate-conveyance roller 5 are in a state capable of separating the documents D fed by the pickup roller 4 to be conveyed.

Next, an operation of closing the openable and closable cover 22 will be described in a case where the retard roller unit 15 is not reliably mounted to the retard roller holder 19.

Also in a case where the openable and closable cover 22 is closed in a state in which the retard roller unit 15 is not reliably mounted, closing of the openable and closable cover 22 causes the retard roller unit 15 to be pressed toward the retard roller holder 19.

When the retard roller unit 15 is pressed toward the retard roller holder 19, as illustrated in FIG. 11A, the lower inclined surface 191a of the protruding portion 191 of the retard roller holder 19 is brought into abutment against the upper inclined surface 212b of the blocking rib 212 of the conveyance guide 21. In this case, inclinations of inclined surfaces of each of the lower inclined surface 191a and the upper inclined surface 212b are steep, and hence the protruding portion 191 is less liable to enter below the protruding portion 212a. Further, the compression coil spring 20 is arranged between the conveyance guide 21 and the retard roller holder 19. Thus, the protruding portion 191 of the retard roller holder 19 may not enter below the lower inclined surface 212c unless the retard roller unit 15 is strongly pressed against an engagement load of the lower inclined surface 191a and the upper inclined surface 212b, and against an elastic force of the compression coil spring 20.

In this case, when the openable and closable cover 22 is closed, the retard roller 6 of the retard roller unit 15 is pressed by the separate-conveyance roller 5 arranged on the openable and closable cover 22.

As the protruding portion 191 of the retard roller holder 19 enters further below the lower inclined surface 212c of the blocking rib 212, the retard roller unit 15 is more strongly pressed in association with the closing operation of the openable and closable cover 22. Further, before the protruding portion 191 of the retard roller holder 19 enters below the protruding portion 212a of the blocking rib 212, the rib 181 of the retard roller unit 15 enters below the lower surface 193b of the tongue piece 193 of the retard roller holder 19. Therefore, also in a case where the retard roller unit 15 is not reliably mounted to the retard roller holder 19, closing of the openable and closable cover 22 enables the retard roller unit 15 to be reliably mounted to the retard roller holder 19. Note that, the blocking rib 212 is less liable to be warped than the rib 181.

Further, at this time, the separate-conveyance roller 5 presses the retard roller 6 so that the rib 181 passes along the inclined surfaces 19a and 193a, thereby entering below the lower surface 193b of the tongue piece 193. Further, the tongue piece 193 prevents the retard roller unit 15 from rising.

When the openable and closable cover 22 is rotated in the arrow direction B to close the document guide path 31 (close the openable and closable cover 22), the separate-conveyance roller 5 presses the retard roller 6. Then, the separate-conveyance roller 5 compresses the compression coil spring 20 through intermediation of the retard roller 6, the retard roller unit 15, and the retard roller holder 19. As a result, the retard roller 6 is brought into pressure contact with the separate-conveyance roller 5 due to a reaction force of the compression coil spring 20. When the overlapped documents are conveyed, the retard roller 6 can separate the fed overlapped documents so that the documents are conveyed one by one by the separate-conveyance roller 5.

Further, in a case of performing the maintenance on the inside of the automatic document conveyance portion 2, as illustrated in FIG. 3, the openable and closable cover 22 may be opened in the arrow direction A (opening operation). Further, the conveyance guide 21 may be opened in the arrow direction C about the rotation shaft 13a of the document delivery roller pair 13. At this time, the retard roller unit 15 mounted to the retard roller holder 19 is also rotated in the arrow direction C integrally with the conveyance guide 21. However, the rib 181 of the retard roller unit 15 has entered below the lower surface 193b of the tongue piece 193. Thus, the retard roller unit 15 is prevented from falling by the rib 181 of the grip 18 so that the retard roller unit 15 is rotated in the arrow direction C integrally with the conveyance guide 21.

Therefore, the rib 181 serving as a gripping portion and the tongue piece 193 serve as a pair of engagement portions to be engageable with each other. Further, the rib 181 and the tongue piece 193 construct a holding unit. The rib 181 and the tongue piece 193 are configured to prevent (hold engagement) the retard roller 6 from falling off (releasing the engagement) the retard roller holder 19 serving as a rotary member support unit.

Further, the automatic document conveyance portion 2 is constructed so that the user can easily hold (easily perform a gripping operation on) the grip 18 of the retard roller unit 15 at a time of replacing the retard roller 6, thereby enabling easy replacement of the retard roller 6.

Figure 10A:
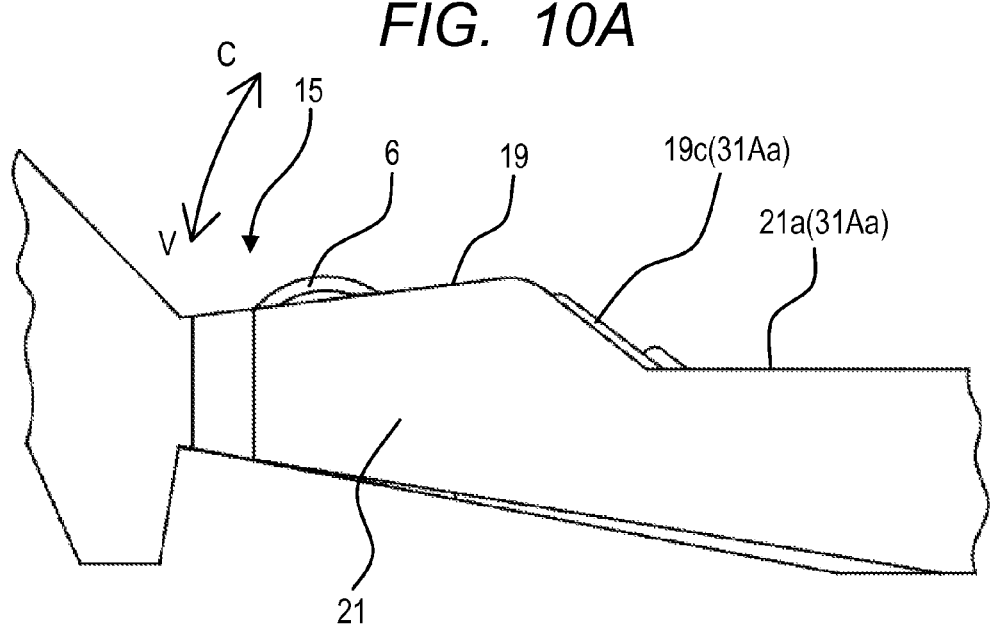
FIG. 10A is a view when a grip of the retard roller is located at a conveyance position.

Next, a structure enabling the easy replacement of the retard roller 6 will be described. In FIG. 2, when the document guide path 31 is closed, the openable and closable cover 22 is locked to the apparatus main body 2A by a locking mechanism (not shown). Further, the separate-conveyance roller 5 arranged in the openable and closable cover 22 presses the retard roller 6. On the other hand, the retard roller 6 receives a pressing force of the compression coil spring 20 serving as a protruding operation unit through intermediation of the retard roller unit 15 and the retard roller holder 19. Thus, the separate-conveyance roller 5 presses the retard roller 6, the retard roller unit 15, and the retard roller holder 19 into the conveyance guide 21 in the arrow direction V in FIG. 3 against the compression coil spring 20. As a result, as illustrated in FIG. 10A, an upper surface 19c of the retard roller holder 19 and the upper surface 21a of the conveyance guide 21 are arranged flush with each other, thereby forming part of the upstream-side portion 31A of the document guide path 31. At this time, the retard roller 6 and the separate-conveyance roller 5 together convey the documents, and hence the retard roller 6 protrudes from the upper surface 19c of the retard roller holder 19. However, the grip 18 of the retard roller unit does not protrude from the upper surface 19c of the retard roller holder 19. Note that, when the retard roller holder 19 is pressed into the conveyance guide 21, the upper surface 19c of the retard roller holder 19 and the upper surface 21a of the conveyance guide 21 form part of the lower guide portion 31Aa of the document guide path 31.

As described above, positions of the retard roller 6 and the retard roller unit 15 are collectively referred to as a conveyance position at a time when the grip 18 does not protrude from the upper surface 21a of the conveyance guide 21, but the retard roller 6 protrudes from the upper surface 21a of the conveyance guide 21. The conveyance position serves as a second position.

Figure 10B:
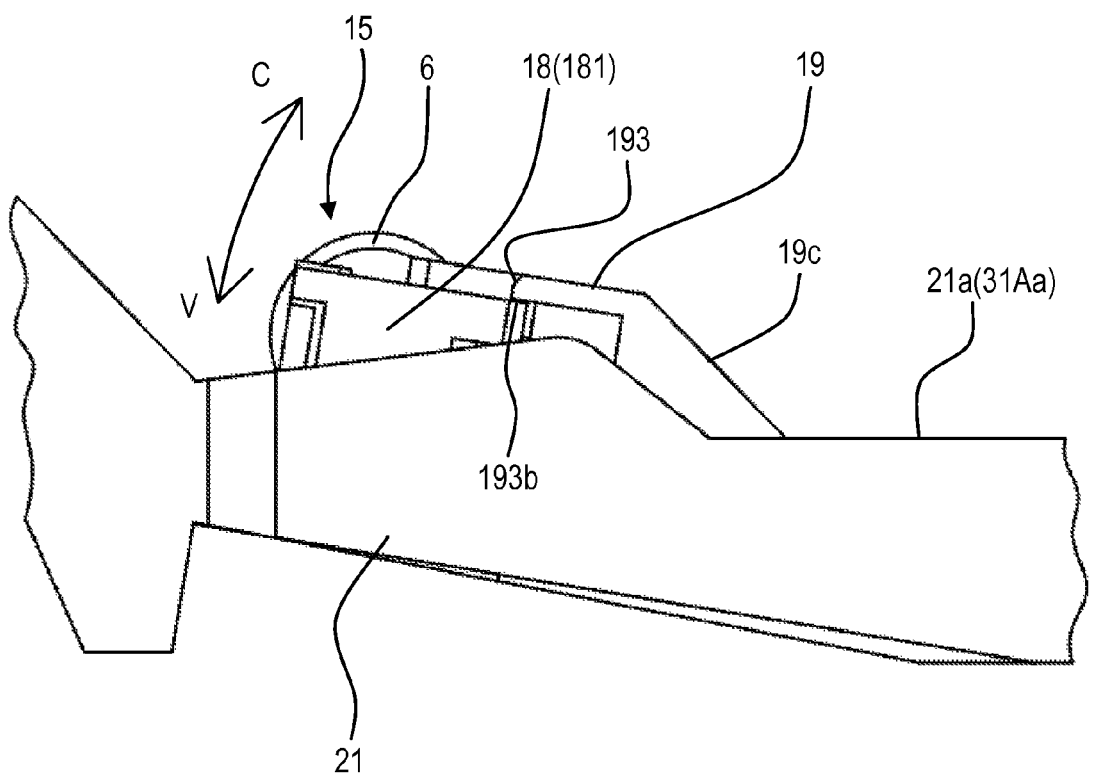
FIG. 10B is a view when the grip of the retard roller is located at a replacement position.
Figure 12:
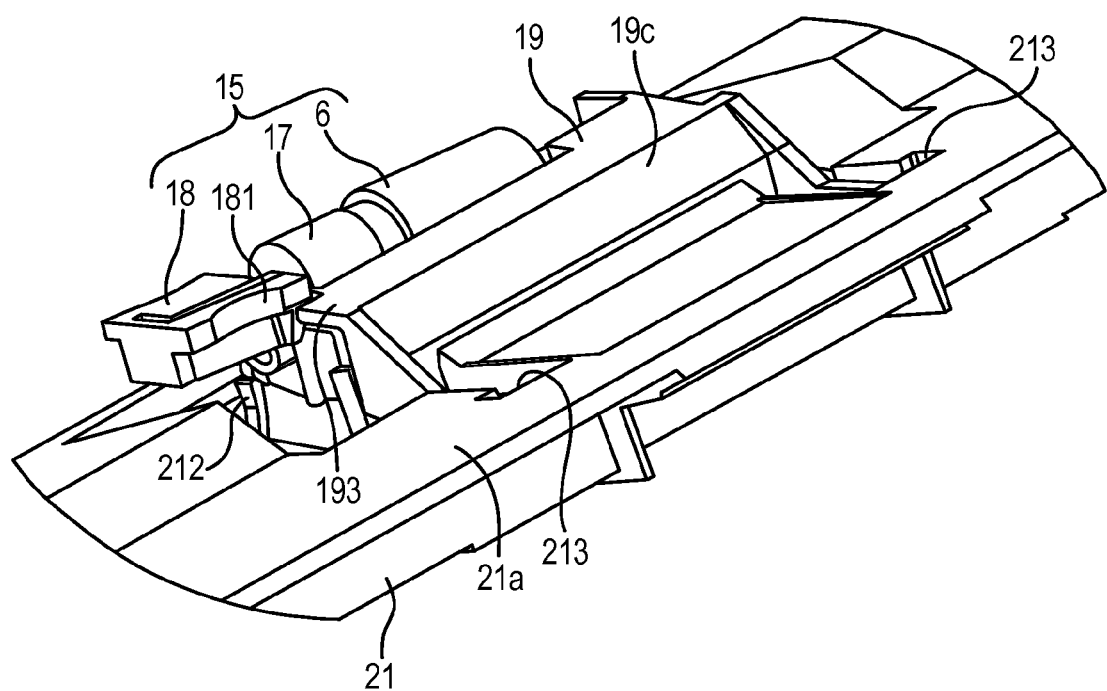
FIG. 12 is a view when the grip is located at the replacement position.
Figure 13:
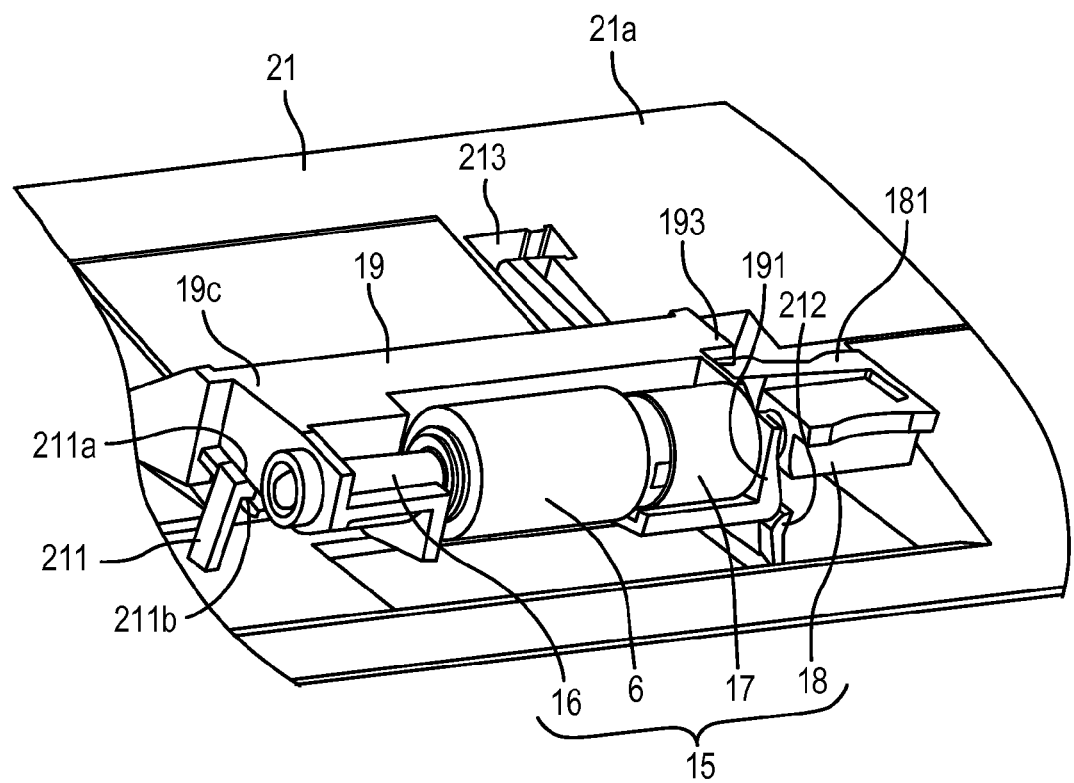
FIG. 13 is a view when the grip is located at the replacement position as viewed from a side opposite to that in FIG. 12.

When the openable and closable cover 22 is rotated in the arrow direction A in FIG. 3 to open the document guide path 31, the separate-conveyance roller 5 arranged in the openable and closable cover 22 separates away from the retard roller 6. Then, the retard roller unit 15 and the retard roller holder 19 are pressed (operated) integrally with each other in the arrow direction C in FIG. 3 by the compression coil spring 20 so that the retard roller holder 19 protrudes above the upper surface 21a of the conveyance guide 21 as illustrated in FIGS. 10B, 12, and 13. With this, the retard roller unit also protrudes above the upper surface 21a of the conveyance guide 21. Positions of the retard roller 6, the retard roller unit 15, and the retard roller holder 19 at this time are collectively referred to as a replacement position (first position).

The retard roller holder 19 located at the replacement position is pressed upward in the arrow direction F by the compression coil spring 20 as illustrated in FIGS. 5B and 9A, thereby being received by the lower surface 211b of the hook 211a of each of the catching members 211 of the conveyance guide 21. Note that, a position of the retard roller holder 19 when the retard roller holder 19 is located at the conveyance position is indicated by the broken line in FIG. 5B. Thus, the retard roller 6, the retard roller unit 15, and the retard roller holder 19 move upward and downward between the conveyance position and the replacement position by a distance L.

When the retard roller 6 is located at the replacement position, the grip 18 and the rib 181 of the retard roller holder 19 protrude above the upper surface 21a of the conveyance guide 21 so that the user can easily grip the grip 18. As a result, the user can easily remove the retard roller unit 15 from the retard roller holder 19, thereby easily replacing the retard roller 6.

Note that, the retard roller unit 15 and the retard roller holder 19 move upward and downward integrally with each other between the conveyance position and the replacement position, and hence their relative positions are not changed. Thus, even when the retard roller holder is located at the replacement position, the retard roller unit 15 protrudes above the upper surface 21a of the conveyance guide 21 without protruding above the retard roller holder 19.

As described above, in the automatic document conveyance portion 2, the compression coil spring 20 causes the rib 181 to protrude from the upper surface 21a of the conveyance guide 21 so that the user can easily hold the rib 181 to easily replace the retard roller 6. Further, in the automatic document conveyance portion 2, the cover used in the related art need not be used, and hence the retard roller 6 can be replaced simply and easily, and a structure thereof can be simplified at the same time.

Further, the image reading apparatus 300 includes the automatic document conveyance portion 2 having such a simple structure, and hence a configuration thereof can be simplified.

In addition, the image forming apparatus 100 includes the image reading apparatus 300 having such a simple structure, and hence a configuration thereof can be simplified.

According to this embodiment, it is possible to provide the automatic document conveyance portion 2 capable of preventing improper mounting of the retard roller 6, the image reading apparatus 300 including the automatic document conveyance portion 2, and the image forming apparatus 100 including the image reading apparatus 300 without providing the cover member configured to hold the retard roller 6.

In the automatic document conveyance portion 2 according to this embodiment, the retard roller 6 can be easily mounted without providing the cover member configured to hold the retard roller 6.

In the automatic document conveyance portion 2 according to this embodiment, in a case where the retard roller 6 is to be mounted or removed, the retard roller holder 19 causes the retard roller 6 to move to the replacement position so that the retard roller 6 protrudes in a removing direction. Further, in a case where the sheets P are conveyed, the retard roller holder 19 causes the retard roller 6 to move to the conveyance position so that a protruding amount of the retard roller 6 in the removing direction is smaller than a protruding amount of the retard roller 6 located at the replacement position. The user can easily hold the retard roller holder 19 to easily replace the retard roller 6. Further, the cover need not be used, and hence the retard roller 6 can be easily replaced. Further, a structure thereof can be simplified.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-100301, filed May 14, 2014 and 2014-100302, filed May 14, 2014, which are hereby incorporated by reference herein in their entirety.

What is claimed is:

1. A sheet conveyance apparatus, comprising:
   a first rotary member;
   a second rotary member configured to rotate together with the first rotary member to nip and convey a sheet;
   a rotary member support unit configured to support the first rotary member at a predetermined position at which the first rotary member is mounted by the first rotary member being fitted into the rotary member support unit in a predetermined direction, the rotary member support unit being movable in the predetermined direction so as to be moved to a conveyance position at which the first rotary member mounted at the predetermined position is enabled to convey the sheet between the first rotary member and the second rotary member;
   an urging unit configured to urge the rotary member support unit in a direction opposite to the predetermined direction; and
   a regulating unit configured to regulate the movement, in the predetermined direction, of the rotary member support unit urged by the urging unit so that the first rotary member is fitted into the predetermined position before the rotary member support unit arrives at the conveyance position in the process of mounting the first rotary member in the rotary member support unit.

2. A sheet conveyance apparatus according to claim 1, further comprising an openable and closable member configured to move the second rotary member closer to or away from the first rotary member,
   wherein the second rotary member presses the first rotary member toward the rotary member support unit in association with a closing operation of the openable and closable member, and
   wherein the second rotary member is moved away from the first rotary member in association with an opening operation of the openable and closable member.

3. A sheet conveyance apparatus according to claim 2, wherein the first rotary member is mounted to the rotary member support unit in association with the closing operation of the openable and closable member.

4. A sheet conveyance apparatus according to claim 2, wherein, when the openable and closable member is closed, a conveyance path in which the sheet is conveyed is formed in the sheet conveyance apparatus.

5. A sheet conveyance apparatus according to claim 1, further comprising an openable and closable member configured to move the second rotary member closer to or further away from the first rotary member,
   wherein the regulating unit regulates the movement in the predetermined direction of the rotary member support unit when the openable and closable member is closed.

6. An image reading apparatus, comprising:
   a sheet conveyance apparatus as recited in claim 1; and
   an image reading portion configured to read a document conveyed by the sheet conveyance apparatus.

7. An image forming apparatus, comprising:
   an image reading apparatus as recited in claim 6; and
   an image forming portion configured to form an image on a sheet in accordance with image information of the image reading apparatus.

8. A sheet conveyance apparatus according to claim 1, further comprising a gripping portion configured to remove the first rotary member from the rotary member support unit, the gripping portion being configured to release an engagement holding in association with a gripping operation when the first rotary member is to be removed from the rotary member support unit.

9. A sheet conveyance apparatus according to claim 8, wherein the gripping portion is elastically deformed in association with the gripping operation to release an engagement between the first rotary member and the rotary member support unit.

10. A sheet conveyance apparatus according to claim 8, wherein the gripping portion prevents the first rotary member from falling off the rotary member support unit when the rotary member support unit is moved.

11. A sheet conveyance apparatus according to claim 8, further comprising a stacking portion on which a plurality of sheets are stacked, wherein the first rotary member comprises a separating member configured to separate the plurality of sheets stacked on the stacking portion one by one by rotating together with the second rotary member.

12. An image reading apparatus, comprising:
a sheet conveyance apparatus as recited in claim 8; and
an image reading portion configured to read a document conveyed by the sheet conveyance apparatus.

13. An image forming apparatus, comprising:
an image reading apparatus as recited in claim 12; and
an image forming portion configured to form an image on a sheet in accordance with image information of the image reading apparatus.

14. A sheet conveyance apparatus according to claim 8, wherein the gripping portion is engaged between the first rotary member and the rotary member support unit when the regulating unit acts on the rotary member support unit.

15. A sheet conveyance apparatus according to claim 1, wherein the regulating unit regulates the movement, in the predetermined direction, of the rotary member support unit in a state of being urged by the urging unit.

16. A sheet conveyance apparatus according to claim 1, wherein, when the first rotary member is to be mounted or removed, the urging unit urges the rotary member support unit toward a replacement position at which the rotary member support unit protrudes in the direction opposite to the predetermined direction more than the conveyance position.

17. A sheet conveyance apparatus according to claim 1, wherein the regulating unit regulates the movement, in the predetermined direction, of the rotary member support unit until the first rotary member is fitted into the rotary member support unit.

* * * * *